July 15, 1947.  W. H. WALKER  2,423,916
FRICTION DRIVE CONTROL
Filed July 12, 1945  3 Sheets-Sheet 1

INVENTOR
William Harley Walker
BY John E. Jackson
ATTORNEY

INVENTOR
William Harley Walker
BY John E. Jackson
ATTORNEY

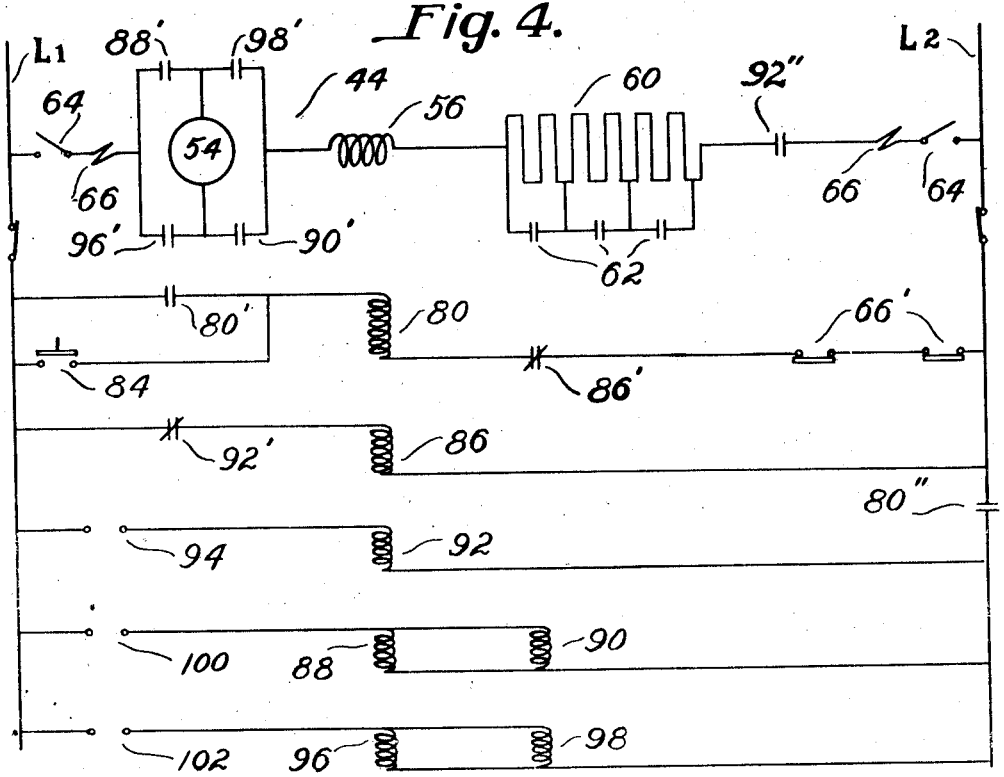
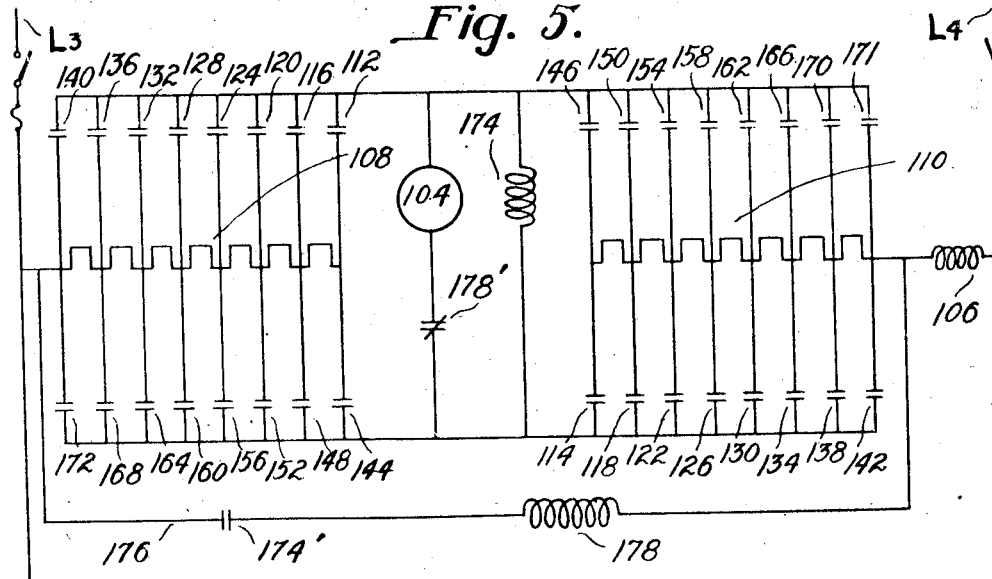

Patented July 15, 1947

2,423,916

UNITED STATES PATENT OFFICE 2,423,916

FRICTION DRIVE CONTROL

William Harley Walker, Harvey, Ill.

Application July 12, 1945, Serial No. 604,678

11 Claims. (Cl. 212—11)

This invention relates to a control for friction drives whereby the driving means is automatically stopped after a period of operation of a predetermined time sufficient to accomplish the desired actuation of the driven element.

The invention has among its objects the provision of a simple, efficient, automatic control for friction drive mechanism to shut-off the driving means after a predetermined period of operation, thereby avoiding unnecessary wear of the parts of the friction drive and of its driving means.

More particularly the invention has for its object the provision of an improved control for the frictional driving means for opening and closing and gripping of hoist tongs so that the drive is limited to the necessary period of operation to accomplish the desired operation of the jaws, thereby resulting in a greater length of life of the jaw operating mechanism and reducing maintenance expense for the hoist.

These and other objects of the invntion will be more fully apparent in the following description.

The invention will be more readily understood by reference to the accompanying drawings, in which.

Figure 4 is a wiring diagram of a control circuit for the motor actuating the friction drive for opening and closing the jaws of the tongs, the circuit employing magnetically actuated starting and accelerating switches; and Figure 5 is a wiring diagram of an alternative control circuit for the friction drive drum motor, such circuit employing a manually operated reversing and accelerating switch, such as a drum controller.

The friction drive control mechanism of the present invention is disclosed in the following description in connection with its use in a hoisting device employing a friction drive for the opening and closing of the article gripping tongs. In such application the friction drive control displays perhaps some of its greatest advantages.

It will be understood, however, that the control is capable of use to advantage in other types of mechanism employing one or more intermittently operating elements driven by means of a friction drive.

Figure 1:
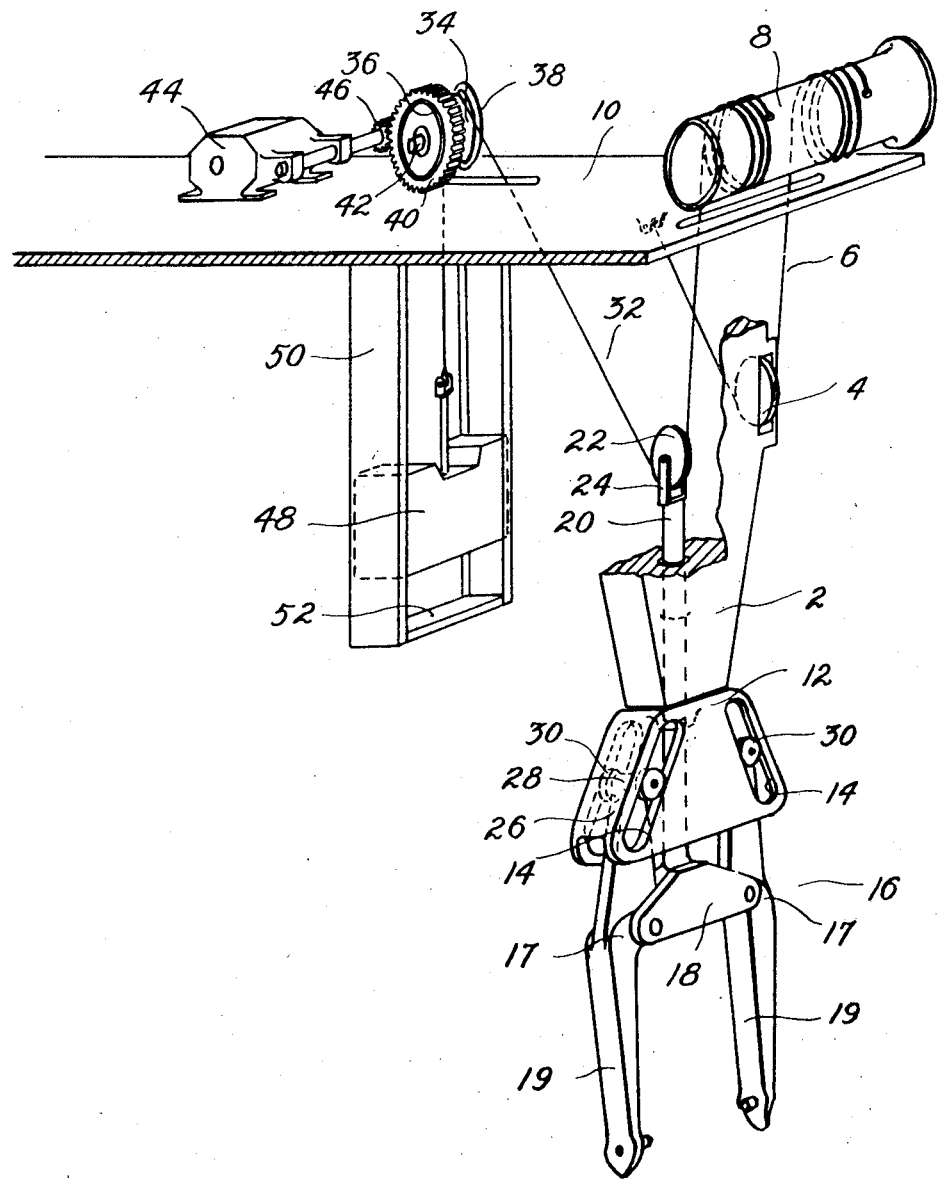
Figure 1 is a schematic view of hoisting mechanism comprising hoisting tongs, mechanism for opening and closing the jaws of the tongs, and means for raising and lowering the tongs and the article engaged thereby.
Figure 2:
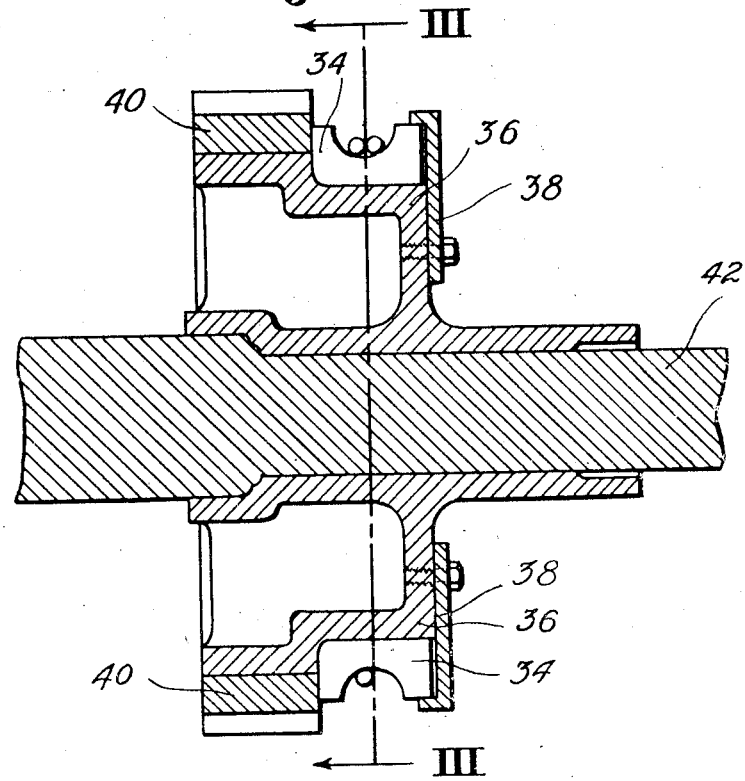
Figure 2 is a view in cross section through the friction driving drum of the mechanism for opening and closing the jaws of the tongs.
Figure 3:
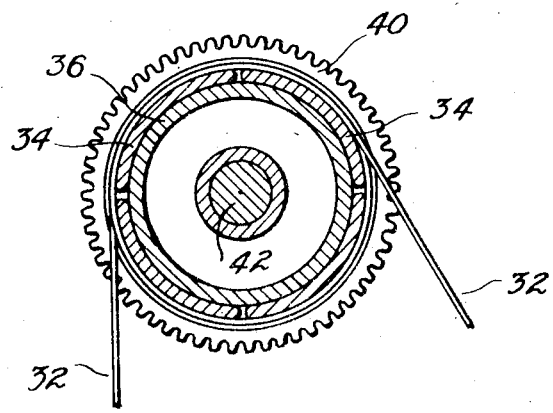
Figure 3 is a view in cross section through the friction drum shown in Figure 2, the section being taken along the line III—III of Figure 2.

The hoisting mechanism shown in Figures 1, 2, and 3 consists of a hoisting frame 2 having one or more hoisting sheaves, such as sheave 4, journaled therein to receive a hoisting cable 6 by which the frame is raised or lowered. Cable 6 is attached at one end to a relatively fixed support such as the frame 10 of a crane trolley, and the other end is attached as shown to a rotatable hoisting drum which may be driven in either direction to raise or lower the frame by a reversible hoisting motor (not shown). Attached to the lower end of hoisting frame 2 is a roller guide frame 12 having sets of oppositely inclined guide tracks 14 therein. The gripping tongs, generally designated by the reference character 16, are composed of a pair of opposed gripping levers 17 pivotally attached to a cross head 18, the lower ends 19 of levers 17 having article engaging means thereon. In the present instance, since the tongs are to be used for the hoisting of ingots as for instance, from a soaking pit, such article engaging means consist of conically pointed projections which dig into the ingots when the tongs are closed.

Cross head 18 is attached to the lower end of the rod 20 which is vertically reciprocable in the hoisting frame, the rod having a tong actuating sheave 22 mounted on the upper end thereof through the medium of bracket 24. The upper arms 26 of levers 17 are provided at their upper ends with an integral cross member 28 for supporting on each side thereof a roller 30, each of which runs in one of the inclined guide tracks 14. In can thus be seen that when cross head 18 is lowered with respect to the roller guide 12, and consequently, the hoisting frame 2, rollers 13 running in the inclined guide tracks cause the lower tong arms 19 to approach each other and thus to engage an article between them, and conversely, that upon raising of the cross head 18 arms 19 are caused to be separated.

Reciprocation of the cross head 18 is effected by means of the tong actuating cable 32, one end of which is attached as shown to the hoisting drum 8 and the other end of which is led to the friction drive mechanism in the upper left hand portion of Figure 1 where it is wrapped several times about the segmental brass rings 34, which have frictional engagement with the driven slip drum 36, and is then led downwardly where it is connected to the counterweight 48 reciprocable in the vertical guideway 50. As shown more clearly in Figures 2 and 3, the friction drive mechanism consists of driven slip drum 36 journaled on axle 42 and driven by the geared tong drive motor 44 through the medium of the motor pinion 46 on the motor drive shaft and the ring gear 40 attached to the slip drum. The segmental friction ring portions 34 are loosely mounted upon a circular cylindrical surface of the drum and are held from axial movement by means of the retaining ring 38 bolted to the drum, as shown. When the several wraps of the tong actuating cable around the segments are under substantial tension the segments are thrust against the slip drum with sufficient force to provide adequate power to open or close the gripping arms of the tongs. When, however, tension in cable 32 has been substantially decreased, as for instance when counterweight 48 reaches the end of its downward travel and rests upon the counterweight travel limit 52, the tongs geing fully open when the counterweight is in this position, the segments are held relatively lightly in contact with the slip drum and consequently remain stationary while the drum rotates within them. Slippage likewise occurs between the drums and the segments when the counterweight reaches the upper limit of its travel in its guideway, in which case the gripping arms of the tongs are fully closed.

The slipping of the drum relative to the friction segments naturally occasions wear on both the parts, but such frictional drive is necessary to protect the tongs and the operating mechanism from the application of an undue amount of force. Although crane operators are instructed to limit operation of the tong opening and closing mechanism to that needed for the operation of the hoisting means, they frequently either from necessity or negligence allow the frictional driving means to run continuously for undue periods of time when the tongs are either completely open, that is, in article engaging position, or completely closed, thereby resulting in an undue amount of wear on the slip drum, the friction segments, and the motor and other driving means for the friction drive. The present invention provides a simple and economical means whereby actuation of the friction driving means for opening and closing of tongs is limited to periods in which actuation of the tong opening and closing means is necessary.

Briefly, the invention resides in the provision of a time delay relay mechanism in the control circuit for the friction drive motor, such time delay relay being automatically initiated upon starting of the motor for either opening or closing of the tongs. By such mechanism the motor is permitted to operate for a sufficient length of time for either completely opening or closing the tongs, after which it is automatically shut-off and cannot be operated again until the control mechanism has been reset for another tong opening or closing cycle by the operator.

In Figure 4 there is shown a control circuit for the friction drive motor employing magnetically operated starting, reversing, and accelerating switches. As there shown, power for the tong opening and closing motor 44 is provided by electrical lines L₁ and L₂. The motor, which in this instance is of the series D. C. type having an armature 54 and a field 56, is connected across the lines L₁ and L₂ in series with the motor accelerating means, which consists of resistance 60 and resistance short-circuiting accelerating contactors 62 in parallel with the resistance. Also in series with the motor are the knife switches 64, the coils 66 of overload protective relays, and the line contactor 92". Reversal of the motor is effected by means of reversing contactors connected to the armature 54 as shown, contacts 88' and 90' being closed and contacts 96' and 98' being open when the motor rotates in the forward direction, and contacts 96' and 98' being closed and contacts 88' and 90' being open when the motor rotates in the reverse direction. Also connected across the lines L₁ and L₂ is a circuit consisting of the master switch contacts 84 and the voltage relay contacts 80' in parallel, these in turn being connected in series with the voltage relay coil 80, the time delay relay contacts 86' and the two sets of overload protective relay contacts 66'. Further circuits connected across the lines consists of that having the normally closed relay contacts 92' in series with the coil 86 of the time delay relay, that consisting of the contacts 94 of the master starting switch in series with the coil 92 for actuating line contactor 92" and contacts 92', that consisting of contacts 100 of the master starting switch connected in series with the coils 88 and 90, connected in parallel for actuating contacts 88' and 90', respectively, for actuation of the motor in the foreward direction, and that consisting of contacts 102 of the master starting switch in series with the coils 96 and 98, connected in parallel, for actuation of the contacts 96' and 98', respectively, for actuation of the motor in the reverse direction. A further set of contacts 80" of the voltage relay is located in line L₂, to deenergize the last three mentioned circuits upon loss of voltage between lines L₁ and L₂.

The master starting switch, which is of a wellknown type, is so constructed that when it is put in the forward "on" position, contacts 84 are opened and contacts 94 and 100 are closed. When it is put in the reverse "on" position, contacts 84 are opened, and contacts 94 and 102 are closed. Stopping of the motor is effected manually by opening of the master starting switch contacts 94 and 102 or 100 and closing contacts 84. The opening of contacts 94 and 100 or 102 deenergizes coils 92, 88, and 90 or 96 and 98, thus opening line contactor 92" and directional contacts 88' and 90' or 96' and 98'.

Automatic stopping of the motor after a sufficient length of operation to open or close the tongs is accomplished by the time delay relay. The time delay relay having coil 86 is normally energized to hold contacts 86' closed through the closed contacts 92' when motor 44 is not in operation. When the motor is started, however, by the master switch, which involves closing of contacts 94, contacts 92' are opened and contacts 92" are closed by the energization of coil 92; the time delay relay coil 86, being thus deenergized allows the opening of contacts 86', the deenergization of voltage relay coil 80, and consequently the opening of contacts 80' and 80" after a predetermined period of operation of the motor.

The time delay relay may be any one of various known types in which the contacts are opened a predetermined interval after deenergization of the coil. A typical relay of this type is that made by the General Electric Company, designated CR 2820–1088, in which the movable armature carrying the movable contact is urged away from the solenoid core by an adjustable pressure spring, a replaceable shim of non-magnetic material being employed between the armature and the core to create an air gap when the armature is in the closed position. The solenoid coil is copper-jacketed, so that upon cessation of current to the solenoid the change in the magnetic flux causes a circulating current to flow in the copper jacket that helps to maintain the magnetic flux conditions, thereby delaying the drop out of the armature. Such delay may be adjusted by varying the spring pressure to which the armature is subjected and the thickness of the shim between the core and armature. When used in the particular hoisting mechanism illustrated a time delay of five to six seconds have proved to be sufficient to permit complete opening or closing of the tongs.

The hoisting apparatus provided with the control circuit shown in Figure 4 operates as follows:

When the crane operator wishes to close the tongs he operates the master switch in the appropriate direction to cause cable 32 to unwind from the slip drum and to allow the cross head 18 to travel downwardly. Such actuation of the master switch opens contacts 84 and closes contacts 94 and either contacts 100 or contacts 102, closing directional contacts 88' and 90' or 96' and 98' and the line contactor 92'', operating the motor to open or close the tongs, closing contacts 92'' being accomplished by energizing coil 92 and closing the directional contacts by energizing coils 88 and 90 or 96 and 98. Energizing coil 92 also causes contacts 92' to open. After an elapse of time, five to six seconds in this case, the flux in time delay relay 86 has decayed to a predetermined point, and the armature of the relay moves away from the coil opening contacts 86'. Opening contact 86' immediately deenergizes coil 80 opening holding circuit contacts 80' and contacts 80''; this in turn deenergizes coils 92 and 94 or 100, opening contacts 92'' and 88' and 90' or 96' and 98' stopping the motor. The master switches may be left in the "on" position indefinitely but must be returned to the "off" or neutral position closing contacts 84 at least momentarily to reclose contacts 80' and 80'' through energization of coil 80, contacts 86' having been reclosed when coil 86 was energized by the closure of contacts 92' actuated by the deenergization of coil 92 as previously described.

In Figure 5 there is shown an alternative control circuit employing a time delay relay circuit in accordance with the present invention in connection with a manual type control for the motor, such as a drum type controller. In this circuit the motor actuating the friction driving means for opening and closing the hoist tongs is shown as having an armature 104 and a field 106, the motor being of the D. C. series type. The motor is connected across lines L3 and L4, which furnish current thereto, through resistances 108 and 110 as shown, the resistances having taps taken off them at intervals so that various amounts of resistance may be interposed in series with the motor. By the closing of selected contacts on the controller the speed of the motor may be varied as desired. When the controller is operated to close contacts 112 and 114, the motor is started from rest in a forward direction but at a slow speed since all of the resistances 108 and 110 are placed in series therewith. Upon progressive movement of the controller toward the full speed position, contacts 116, 118; 120, 122; and so forth, are progressively closed, thereby cutting out progressively increased portions of the resistances until, when contacts 140 and 142 are closed, the motor is placed directly across the line and runs at full speed. If, on the other hand, it is desired to operate the motor in the reverse direction, the controller is moved from the "off" position first to close contacts 144 and 146, which starts the motor at slow speed with the full resistances in the line, and the controller is then progressively moved to the full speed position in the reverse direction when contacts 171 and 172 are closed.

The coil 174 of the time delay relay is connected in parallel with the motor armature 104, said relay having contacts 174' in the line 176 which runs from main L3 to main L4 through the series field 106. Also positioned in line 176 is the coil 178 of a relay having normally closed contacts 178' in the line leading directly to the armature of the motor. The time delay relay in this instance is of the type which closes the contacts of the circuit which it controls a predetermined time after a given energization of the time delay relay coil. Thus, when the voltage across the armature of the motor and consequently the voltage across coil 174 reaches a given value, the relay begins to function to bring about closing of its contacts 174'. Such time interval is chosen, as before, so that it is sufficient to allow a complete tong opening or tong closing operation to be completed. Upon closing of contacts 174' after such predetermined interval, coil 178 is energized, thereby immediately opening contacts 178' and breaking the current supply to the motor armature. Contacts 178' remain open, due to the continued energization of coil 178, until the controller has been brought back to its "off" position at which time coil 174 of the time delay relay is deenergized and contacts 174' are opened, thus restoring the circuit to the proper condition for another tong opening or closing operation.

Numerous known types of time delay relays may be used for that shown in Figure 5; among these one of which has proved satisfactory is a portion of the General Electric starter CR 4052 embodying a mechanical escapement type relay. For the purpose in hand, only the connections of such starter utilizing such relay are used. This relay consists of an actuating solenoid and a plunger mechanism linked through an escapement mechanism to a shaft operating contact fingers so that the contacts are closed a predetermined adjustable interval after energization of the solenoid. The time settings of the contact finger are readily adjustable by changing the position of the gear link in the escapement with respect to the operating shaft.

It will thus be apparent in view of the foregoing that such control circuit of the present invention with either the magnetic switch or manually operated drum type controller obviates the difficulties heretofore experienced by reason of the unnecessary continued operation of the friction drive after the opening or the closing of the tongs has been accomplished. Such automatic shutting off of the drive motor relieves the crane operator from one of his many duties in the operation of the hoisting device, thereby permitting him to perform the other operations with more care and thus increase the safety of the article hoisting and transporting operation. Furthermore, as has been above pointed out, use of the device decreases greatly the wear of the friction drive parts and allows the hoist to operate for much longer periods without shut downs for repair.

Having thus fully disclosed the friction drive control of the present invention and its manner of operation, what I desire to claim as new is the following.

1. In a mechanism having a friction driving means, a means movable between predetermined limits and driven by frictional contact with the driving means, an electric motor driving the friction driving means, and a source of electric current for driving the motor, the improved motor control circuit which comprises a relay having contacts in series with the armature of the motor, a circuit for energizing the relay and thus closing its contacts, a second relay having contacts in series with the circuit for energizing the first relay, said second relay being of the time delay type, and means to initiate actuation of the second relay upon starting of the motor so that the first relay is deenergized and its contacts opened a predetermined time interval thereafter.

2. In a hoisting device employing gripping tongs opened and closed by an actuating cable, a friction driving means incorporating a driven friction drum, friction segments thereon frictionally engageable with the tong actuating cable, and a reversible electric tong actuating motor for driving the friction drum to open and close the tongs, the improved control circuit for the tong actuating motor which comprises a relay having contacts in series with the armature of the motor, a circuit for energizing the relay and thus closing its contacts, a second relay having contacts in series with the circuit for energizing the first relay, said second relay being of the time delay type, and means to initiate actuation of the second relay upon starting of the motor so that the first relay is deenergized and its contacts opened a predetermined time interval thereafter.

3. In a mechanism having a friction driving means, a means movable between predetermined limits and driven by frictional contact with the driving means, an electric motor driving the friction driving means, and a source of electric current for driving the motor, the improved motor control circuit which comprises a relay having contacts in series with the armature of the motor, a circuit for energizing the relay to close the contacts and thus to initiate operation of the motor, and means to deenergize the relay after a predetermined period of operation of the motor to open the relay contacts and thus to stop the motor.

4. In a hoisting device employing gripping tongs opened and closed by an actuating cable, a friction driving means incorporating a driven friction drum, friction segments thereon frictionally engageable with the tong actuating cable, and a reversible electric tong actuating motor for driving the friction drum to open and close the tongs, the improved control circuit for the tong actuating motor comprising a relay having contacts in series with the armature of the motor, a circuit for energizing the relay to close the contacts and thus to initiate operation of the motor, and means to deenergize the relay after a predetermined period of operation of the motor to open the relay contacts and thus to stop the motor.

5. In a mechanism having a friction driving means, a means movable between predetermined limits and driven by frictional contact with the driving means and adapted to slip thereon when it reaches one of its limits of travel, an electric motor driving the friction driving means, and a source of electric current for driving the motor, the improved motor control circuit which comprises a first relay having a coil and a set of contacts operated thereby, the contacts being closed when the relay coil is deenergized, a second relay having a coil and a set of contacts, an operating circuit for the second relay, the contacts of the first relay being in series with the operating circuit for the second relay, the second relay being a time delay relay which holds its contacts closed while its coil is energized and which permits the contacts to open a predetermined time after deenergization of its coil, a third relay having a coil and a set of contacts operated thereby, the contacts being open when the coil is deenergized and closed when the coil is energized, a circuit for energizing the coil of the third relay, the contacts of the second relay being in series with the last named circuit and the contacts of the third relay being in series with the circuit supplying current to the motor, whereby energization of the first and third relays effects starting of the motor and initiates the drop-out action of the time delay relay so that the motor is stopped a predetermined time after it is started.

6. In a mechanism having a friction driving means, a means movable between predetermined limits and driven by frictional contact with the driving means and adapted to slip thereon when it reaches one of its limits of travel, an electric motor driving the friction driving means, and a source of electric current for driving the motor, the improved motor control circuit which comprises a first relay having a coil and two sets of contacts operated thereby, the first set of contacts being open when the relay coil is deenergized and being connected in series with the motor, the second set of contacts being closed when the relay coil is deenergized, a second relay having a coil and a set of contacts, an operating circuit for the second relay, the second set of contacts of the first relay being in series with the operating circuit for the second relay, the second relay being a time delay relay which holds its contacts closed while its coil is energized and which permits the contacts to open a predetermined time after deenergization of its coil, a third relay having a coil and a set of contacts operated thereby, the contacts being open when the coil is deenergized and closed when the coil is energized, a circuit for energizing the coil of the third relay, the contacts of the secod relay being in series with the last named circuit and the contacts of the third relay being in series with the circuit supplying current to the motor, whereby energization of the first and third relays effects starting of the motor and initiates the drop-out action of the time delay relay so that the motor is stopped a predetermined time after it is started.

7. In a hoisting device employing gripping tongs opened and closed by an actuating cable, a friction driving means incorporating a driven friction drum, friction segments thereon frictionally engageable with the tong actuating cable, and a reversible electric tong actuating motor for driving the friction drum to open and close the tongs, the improved motor control circuit which comprises a first relay having a coil and a set of contacts operated thereby, the contacts being closed when the relay coil is deenergized, a second relay having a coil and a set of contacts, an operating circuit for the second relay, the contacts of the first relay being in series with the operating circuit for the second relay, the second relay being a time delay relay which holds its contacts closed while its coil is energized and which permits the contacts to open a predetermined time after deenergization of its coil, a third relay having a coil and a set of contacts operated thereby, the contacts being open when the coil is deenergized and closed when the coil is energized, a circuit for energizing the coil of the third relay, the contacts of the second relay being in series with the last named circuit and the contacts of the third relay being in series with the circuit supplying current to the motor, whereby energization of the first and third relays effects starting of the motor and initiates the drop-out action of the time delay relay so that the motor is stopped a predetermined time after it is started.

8. In a hoisting device employing gripping tongs opened and closed by an actuating cable, a friction driving means incorporating a driven friction drum, friction segments thereon frictionally engageable with the tong actuating cable and a reversible electric tong actuating motor for driving the friction drum to open and close the tongs, the improved motor control circuit which comprises a first relay having a coil and two sets of contacts operated thereby, the first set of contacts being open when the relay coil is deenergized and being connected in series with the motor, the second set of contacts being closed when the relay coil is deenergized, a second relay having a coil and a set of contacts, an operating circuit for the second relay, the second set of contacts of the first relay being in series with the operating circuit for the second relay, the second relay being a time delay relay which holds its contacts closed while its coil is energized and which permits the contacts to open a predetermined time after deenergization of its coil, a third relay having a coil and a set of contacts operated thereby, the contacts being open when the coil is deenergized and closed when the coil is energized, a circuit for energizing the coil of the third relay, the contacts of the second relay being in series with the last named circuit and the contacts of the third relay being in series with the circuit supplying current to the motor, whereby energization of the first and third relays effects starting of the motor and initiates the drop-out action of the time delay relay so that the motor is stopped a predetermined time after it is started.

9. In a hoisting device employing gripping tongs opened and closed by an actuating cable, a friction driving means incorporating a driven friction drum, friction segments thereon frictionally engageable with the tong actuating cable, and a reversible electric tong actuating motor for driving the friction drum to open and close the tongs, the improved control circuit for the tong actuating motor comprising a manual reversing and accelerating controller having resistances in series with the motor armature, a relay having normally closed contacts in series with the motor armature, a circuit for energizing the coil of said relay to open said relay contacts, a second relay having normally open contacts in the circuit for energizing the coil of the first relay, said second relay being of the time delay type and so constructed as to close its contacts a predetermined time after energization of its coil, and a circuit for energizing the coil of the second relay upon starting of the motor, whereby the contacts of the first relay are opened a predetermined time after actuation of the motor.

10. In a hoisting device employing gripping tongs opened and closed by an actuating cable, a friction driving means incorporating a driven friction drum, friction segments thereon frictionally engageable with the tong actuating cable, and a reversible electric tong actuating motor for driving the friction drum to open and close the tongs, the improved control circuit for the tong actuating motor comprising a manual reversing and accelerating controller having resistances in series with the motor armature, a relay having normally closed contacts in series with the motor armature, a circuit for energizing the coil of said relay to open said relay contacts, a second relay having normally open contacts in the circuit for energizing the coil of the first relay, said second relay being of the time delay type and so constructs as to close its contacts a predetermined time after energization of its coil, and a circuit for energizing the coil of the second relay upon starting of the motor, the circuit for energizing the coil of the second relay being connected in parallel with the armature of the motor whereby the contacts of the first relay are opened a predetermined time after actuation of the motor.

11. In a mechanism having a friction driving means, a means movable between predetermined limits and driven by frictional contact with the driving means and adapted to slip thereon when it reaches one of its limits of travel, an electric motor driving the friction driving means, and a source of electric current for driving the motor, the improved motor control circuit which comprises a master control switch for starting and stopping the motor, said switch having a first relay coil operating a first, normally open, contactor in the motor circuit to open and close such circuit and a second, normally closed, contactor, a circuit for energizing the coil of the first relay and thus to close the contactor in the motor circuit and initiate operation of the motor and to open the second contactor, a second relay having contacts operated thereby, said second relay being a time delay relay which holds its contacts closed while its coil is energized and which permits the contacts to open a predetermined time after deenergization of its coil, a circuit supplying current to the coil of the time delay relay, the second contactor of the first relay being in series with the last named circuit, a third relay having contacts operated thereby in series with the motor supply circuit, and a circuit for energizing the coil of the third relay to close its contacts, the contacts of the second relay being in series with the last named circuit.

WILLIAM HARLEY WALKER.

REFERENCES CITED

The following references are of record in the file of this patent:

UNITED STATES PATENTS

| Number | Name | Date |
| --- | --- | --- |
| 622,280 | Shaw | Apr. 4, 1899 |
| 1,915,961 | Suksdorf | June 27, 1933 |